(12) United States Patent
Bosma et al.

(10) Patent No.: US 9,032,087 B2
(45) Date of Patent: May 12, 2015

(54) PROVIDING A FINE-GRAINED RESPONSE FROM A COARSE-GRAINED SERVICE OBJECT

(75) Inventors: John H. Bosma, Cedar Park, TX (US); James Conallen, Souderton, PA (US); Eoin Lane, Littleton, MA (US); Mei Y Selvage, Pocatello, ID (US); Ningning Wang, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 11/777,778

(22) Filed: Jul. 13, 2007

(65) Prior Publication Data
US 2009/0019109 A1   Jan. 15, 2009

(51) Int. Cl.
*G06F 15/16* (2006.01)
*G06Q 10/00* (2012.01)

(52) U.S. Cl.
CPC ........................ *G06Q 10/00* (2013.01)

(58) Field of Classification Search
CPC .................................... G06Q 10/00
USPC ........................ 709/203, 232, 222
See application file for complete search history.

(56) References Cited

U.S. PATENT DOCUMENTS

| | | | |
|---|---|---|---|
| 5,734,903 A * | 3/1998 | Saulpaugh et al. | 719/316 |
| 6,571,297 B1 * | 5/2003 | Cline et al. | 719/328 |
| 7,003,079 B1 * | 2/2006 | McCarthy et al. | 379/32.01 |
| 7,657,522 B1 * | 2/2010 | Puzicha et al. | 707/723 |
| 7,721,193 B2 * | 5/2010 | Upton | 715/234 |
| 8,620,259 B2 * | 12/2013 | Wullert et al. | 455/406 |
| 2003/0065805 A1 * | 4/2003 | Barnes, Jr. | 709/231 |
| 2004/0002942 A1 * | 1/2004 | Pudipeddi et al. | 707/1 |
| 2004/0044730 A1 * | 3/2004 | Gockel et al. | 709/203 |
| 2004/0205764 A1 * | 10/2004 | Snyder et al. | 719/311 |
| 2004/0242329 A1 * | 12/2004 | Blackburn et al. | 463/42 |
| 2007/0110047 A1 * | 5/2007 | Kim | 370/389 |
| 2007/0124463 A1 * | 5/2007 | Madhavapeddi et al. | 709/224 |
| 2008/0304754 A1 * | 12/2008 | Apte et al. | 382/224 |
| 2012/0102100 A1 * | 4/2012 | Soukup et al. | 709/203 |

OTHER PUBLICATIONS (Sameer Tilak, Nael B. Abu-Ghazaleh and Wendi Heinzelman), A Taxonomy of Wireless Micro-Sensor Network Models, Apr. 2, 2002, ACM SIGMOBILE Mobile Computing and Communications Review.*

* cited by examiner

*Primary Examiner* — Ebrahim Golabbakhsh
(74) *Attorney, Agent, or Firm* — Thomas E. Tyson; Gregory K. Goshorn; Greg Goshorn, P.C.

(57) ABSTRACT

A system and method for generating data at a fine level of detail based on a request to a service object that provides data at a coarse level of detail. The request to the service object includes a data request and a response template indicating the level of detail or selection required in the response. The service object server accesses data using the service object api and coarse level of detail. A navigator uses the data request to develop an information model of the data and then traverses the information model to extract the data needed for a response at the level of detail indicated by the response template. The service object is thus able to return data at a fine level of detail from an object that supports only coarse levels of detail.

14 Claims, 6 Drawing Sheets

PROVIDING A FINE-GRAINED RESPONSE FROM A COARSE-GRAINED SERVICE OBJECT

CROSS-REFERENCE TO RELATED APPLICATIONS

There are no related applications.

BACKGROUND OF THE INVENTION

1. Field of the Invention

The present invention relates to computer systems for servicing data and application requests generated by a number of users on client systems connected through a network. More particularly, the invention relates to servicing requests in a service oriented application. Still more particularly, the invention relates to systems for providing data at varying levels of detail selectable by the requesting client.

2. Description of Related Art

Networked computer systems have existed for many years. Such systems allow data to be stored at a central location and supplied to other locations as required by a business or enterprise. For example, the records of a bank may be maintained on centralized computers with tightly controlled facilities and applications. A bank teller accesses the data through a client system or terminal that queries the central computers when data is needed.

Early server or mainframe based systems used "dumb" terminals that were able to access data only according to a format or program stored on the server. The interaction between the client and server was strictly defined by the server. This limited the flexibility of the systems because any requirement to access data in a new or different way required the server software to be changed.

A next generation of networked systems employed "client-server" architectures that provide a "smart" client such as a personal computer or workstation, connected by a network to a server. The "smart" client could run software on its own and modify or reformat data accessed from a server before that data was presented to the client user. These systems provided more flexibility but were still subject to strict limits on which clients could access a computer and what types of data could be accessed. A major change to client requirements typically required a coordinated change to both server and client software systems.

Recent developments have led to the creation of a network architecture known as a "Service Oriented Architecture" or SOA. SOA seeks to make client applications more independent of server applications. In this architecture, the server provides one or more "Services." Each service provides defined functions through well defined application programming interfaces or APIs. Clients systems can then assemble the outputs of many service objects to create unique client applications that can be changed or modified by changing the services accessed. In addition, the services can be changed or upgraded independently of the clients as long as they continue to support the defined APIs.

Increased independence of the client applications from the service objects allows the client to be flexibly reconfigured. Reconfiguration can add access to different services or can replace one service with another that provides superior information. Similarly, the service or server system can focus on providing a high quality and efficient response to a well defined query. It can incorporate new technologies and approaches without fear of harming the client application.

Unfortunately, the desire to have a service object be generally accessible by a multitude of clients requires that the service object APIs be fairly coarse grained in the data returned. By coarse grained it is meant that the data returned is not filtered or limited only to the data necessary for the client application but instead is more broadly defined as responsive to a service request. For example, a service object that provides information about customer accounts will provide all customer account information even though the client does not require all of the information. In this example, a bank teller may need to access a customer's telephone number. The bank teller client system will request this information from the account service object and receive back all of the information maintained on the customer account. This leads to inefficient use of network bandwidth and computing resources.

One solution is to define more detailed service object interfaces or APIs. In the example, an API could be defined that returns only the customer telephone number. The problem with this approach is that increasing the number of service object interfaces decreases the independence of the client and increases the work required to support the server hosting the service object. As the number of detailed APIs increase they approach the complexity and binding of client/server computer systems.

Thus, a technical problem exists in providing a generalized server system with a service interface that is accessible to a large number of clients through a generalized coarse grained API yet is able to provide fine grained or focused data to the clients.

BRIEF SUMMARY OF THE INVENTION

The present invention is directed to solving this problem by enabling the service object to accept coarse grained data requests but to also accept a client specified response template. The response template will specify the fine grained data desired by the client. A server system according to the present invention provides a system and method for traversing the information model presented by the data request to generate a fine grained response based on the data accessed and the response template.

The present invention is directed to a method for providing detailed data from a web service by first receiving a web service request at a server from a requester, with the web service request containing a data request, and a desired data response model. The service accesses data in response to the web service request, determines a request information model from the data request, traverses thew request information model and creates a data response from the accessed data where the information model satisfies a data response model element. Finally, the service returns the data response to the requester.

BRIEF DESCRIPTION OF THE DRAWING

FIG. 6B is a second part of a sequence diagram illustrating at a lower level of detail an embodiment of the present invention.

The preferred embodiment of the present invention will be described with reference to the above views of the Drawing where like elements are referenced by the same reference numbers.

DETAILED DESCRIPTION OF THE INVENTION

Figure 1:
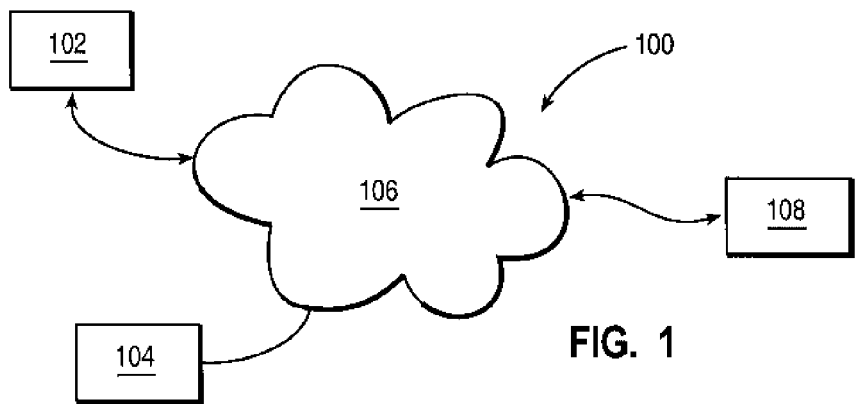
FIG. 1 is a network diagram illustrating a typical networked environment.

A networked computer system 100 is shown generally in FIG. 1. The networked computer system includes client devices 102, 104 and a server 108 hosting a service object. The clients and server are connected through a network 106 which can be any of the well-known forms of networks such as wide-area networks (WANs), local area networks (LANs), or others connected by wiring, or wirelessly using telephone, radio or satellite transmissions.

The client systems 102, 104 and the server system 108 can be any type of computer system that supports the software necessary to run an application. Server systems can be based on different operating systems such as UNIX® (a trademark of the Open Group), LINUX® (a trademark of Linus Torvalds), MICROSOFT WINDOWS® (a trademark of Microsoft, Inc.), or SOLARIS® (a trademark of Sun Microsystems, Inc.) Client systems can be traditional personal computers or workstations or can be terminal devices such as smartphones, PDAs, or similar devices.

Figure 2:
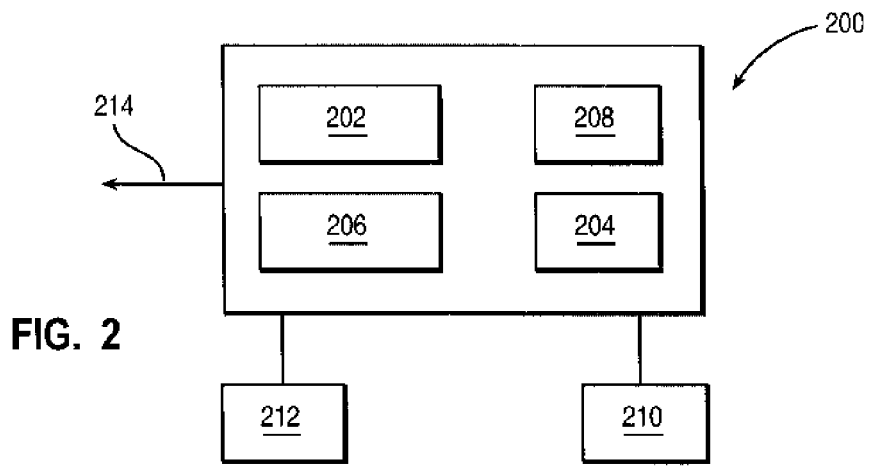
FIG. 2 is a block diagram of a computer system for implementing a preferred embodiment of the present invention.

Client and server systems will have components generally as shown in FIG. 2. The system 200 has a processor 202 and some form of volatile or non-volatile memory 208. The system has an input/output controller 204 for interfacing with devices such as keyboards, pointing devices, touch screens, displays, or sound devices 210. In addition, the system may have internal non-volatile storage 206 or some form of external or removable non-volatile storage 212. Finally, both client and server systems must have the ability 214 to interconnect and communicate over a wired or wireless network.

While the present invention has been described with only two client devices and a single server, the invention is in no way limited to a certain number of clients or servers. A network may have hundreds or thousands of clients and tens or hundreds of servers. One client may access service objects from multiple servers when building a particular application view.

Figure 3:
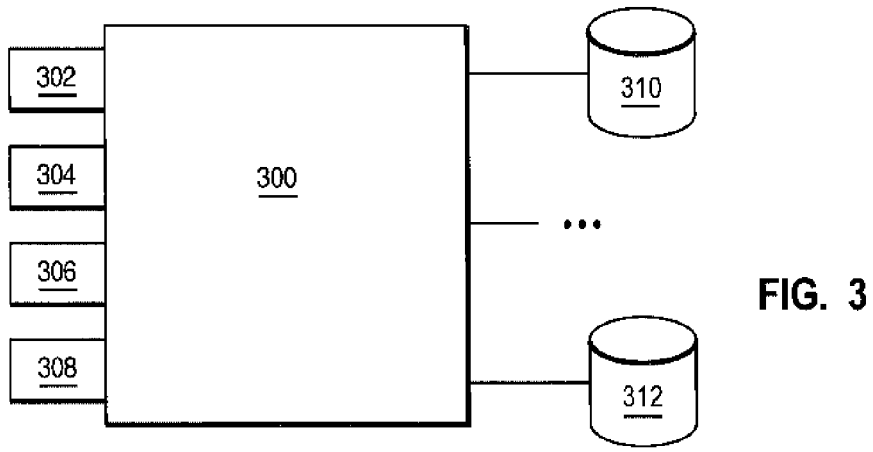
FIG. 3. is a block diagram illustrating a service object architecture.

A service object can be depicted as shown in FIG. 3. The service object 300 is able to access one or more data stores 310, 312. The service object presents a number of well defined application programming interfaces (APIs) 302, 304, 306, 308 to the network. Each of these APIs defines the form a request for information may take and the information that is available in response to that request.

A service object may be described using the Web Services Description Language (WSDL), a standard language defined by the World Wide Web Consortium (http://www.w3.org/TR/wsdl). The present invention is applicable, however, to any form of services description whether or not it conforms to a standard.

A prior art web service accepted client service requests and provided data back to the client according to the defined service API. The present invention introduces a novel method for processing the data retrieved by the service object before returning that data to the client so that only the necessary data is returned to the client. This has the advantage of allowing the service object to publish a limited number of coarse grained APIs that preserve the separation of client and service function. At the same time, this novel method permits the client to request a fine grained data by including a response template with its data request.

Figure 4:
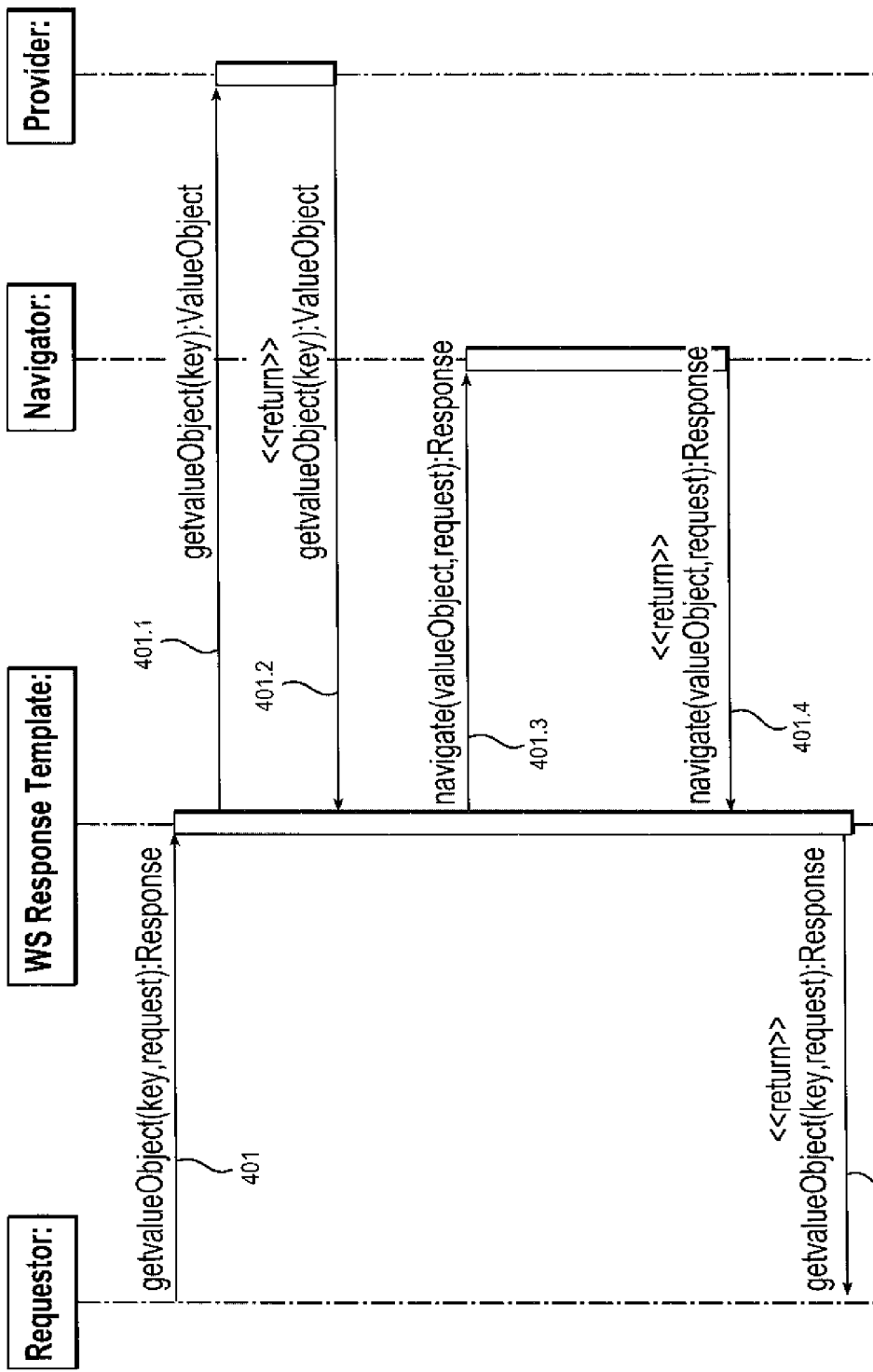
FIG. 4 is a sequence diagram showing the overall process according to an embodiment of the present invention.

The server side processing to return a fine grained response is provided by a data "navigator." The generalized processing of a service request according to the present invention is shown in FIG. 4. A client request 401 is sent to the service object. The web service response template accesses 401.1 a data provider to obtain the requested coarse grained data. The navigator then processes the coarse grained data 401.3 according to a response template provided by the requestor. When a response has been assembled 401.4 it is returned 402 as a fine grained response to the requester.

Figure 5:
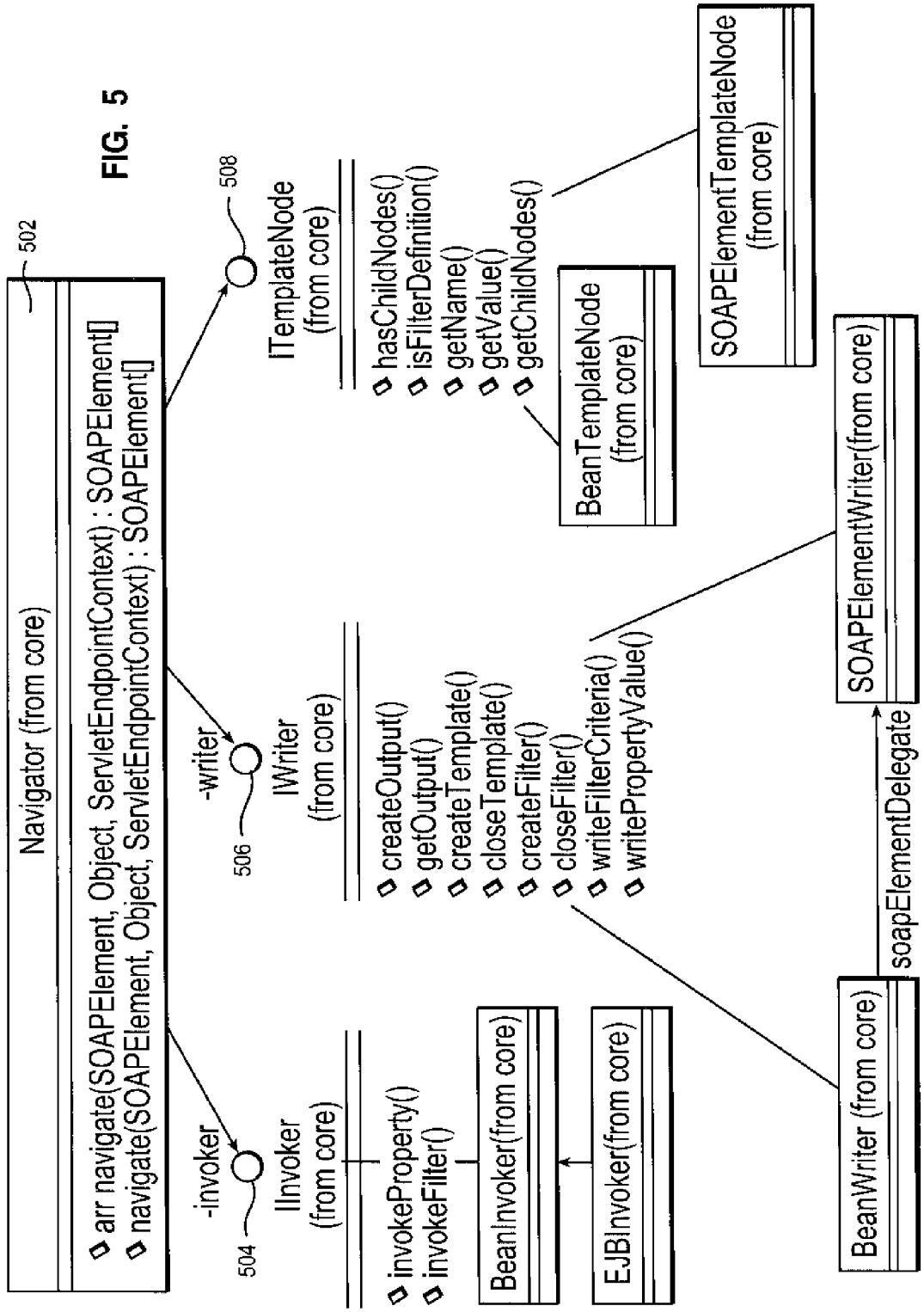
FIG. 5 is an object diagram illustrating an embodiment of the present invention.

The navigator structure of the preferred embodiment of the present invention is shown in FIG. 5. Navigator object 502 is responsible for controlling the process of transforming the coarse grained data request into a fine grained response.

The service object data request 401 includes information that can be used to define a data model of the coarse grained data. This information includes the interface definition of the data elements and the relationship between them. The information model can be represented as a hierarchy or tree of linked elements. Navigator 502 manages the process of traversing this information model to extract the response data requested by the client requester.

TemplateNode 508 provides navigation path information based on the information model. The navigation paths are translated into method invocations by the Invoker 504. The methods or processes are used to apply the selection rules necessary to extract the fine grained data from the coarse grained request. Writer 506 then formats the response data for return to the requester.

The TemplateNode 508 and Writer 506 process templates and responses defined either in terms of "Beans" or "SOAPElements." "Beans" are well defined objects usually written in the Java programming language. They have defined interfaces and standard methods that promote reuse. A SOAPElement similarly is a defined object for communication between networked applications using HTTP. SOAP stands for Simple Object Access Protocol and is an XML protocol for communicating between service objects. The ability of the present invention to process templates and objects in either format increases its ability to meet data requirements from diverse requesters using varied service objects. The present invention is not limited to these two protocols and can work with any object description language or interface description protocol. For example, the method invocation can be performed by Java introspection or an output response can be defined as a simple mapping of elements from the request to response.

Figure 6A:
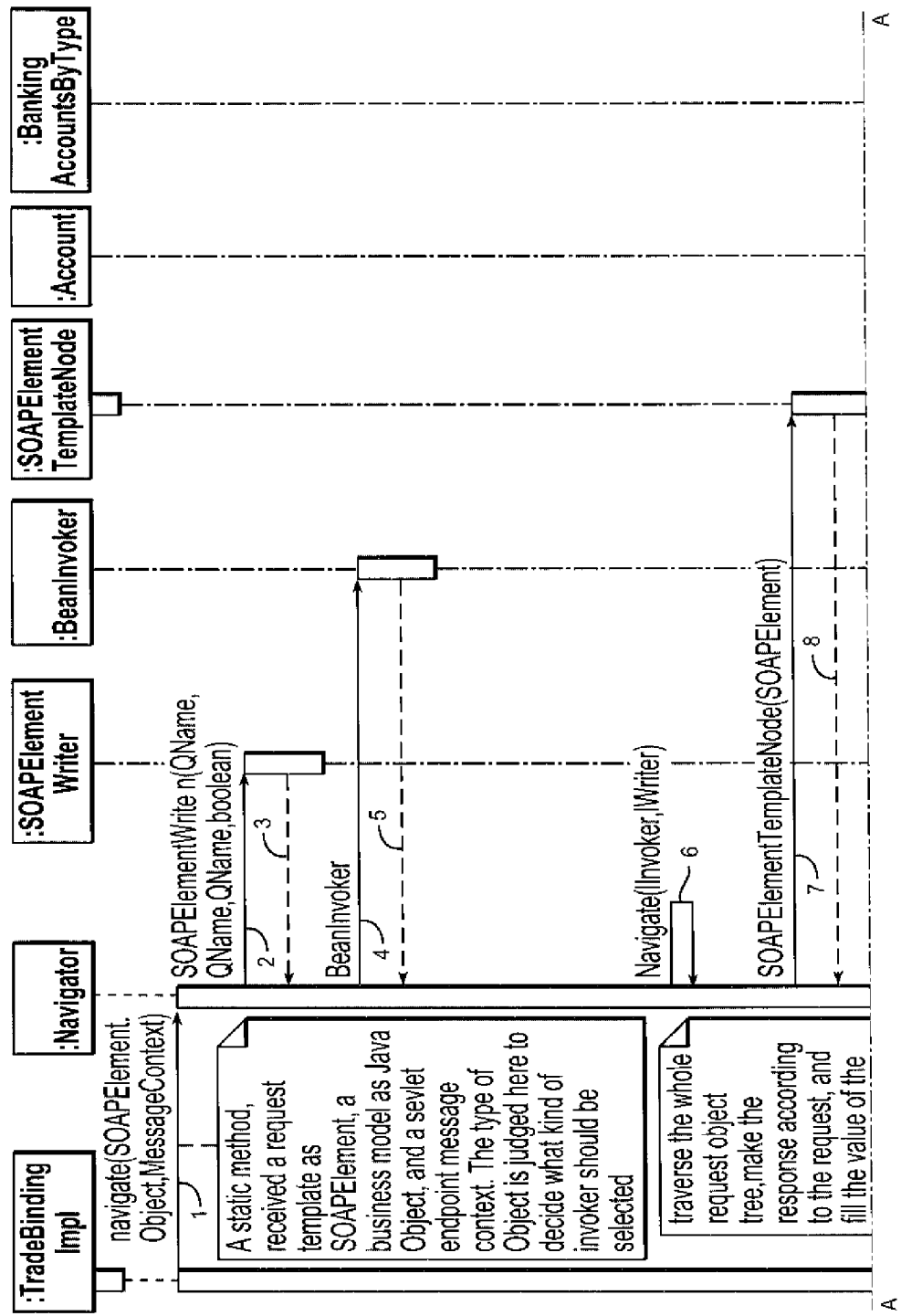
FIGS. 6A 6B, and 6C present a sequence diagram illustrating at a lower level of detail an embodiment of the present invention.
Figure 6B:
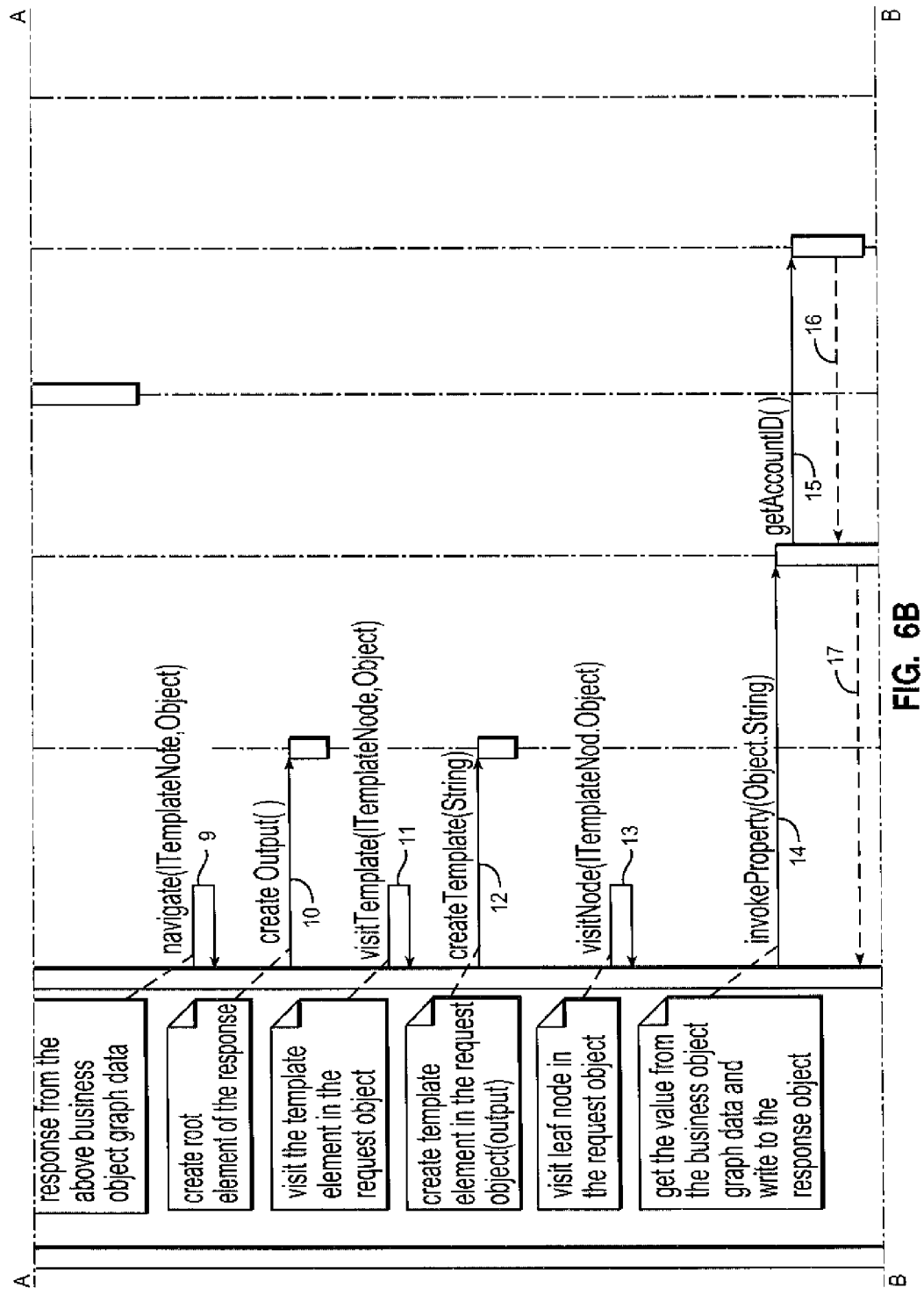
Figure 6C:
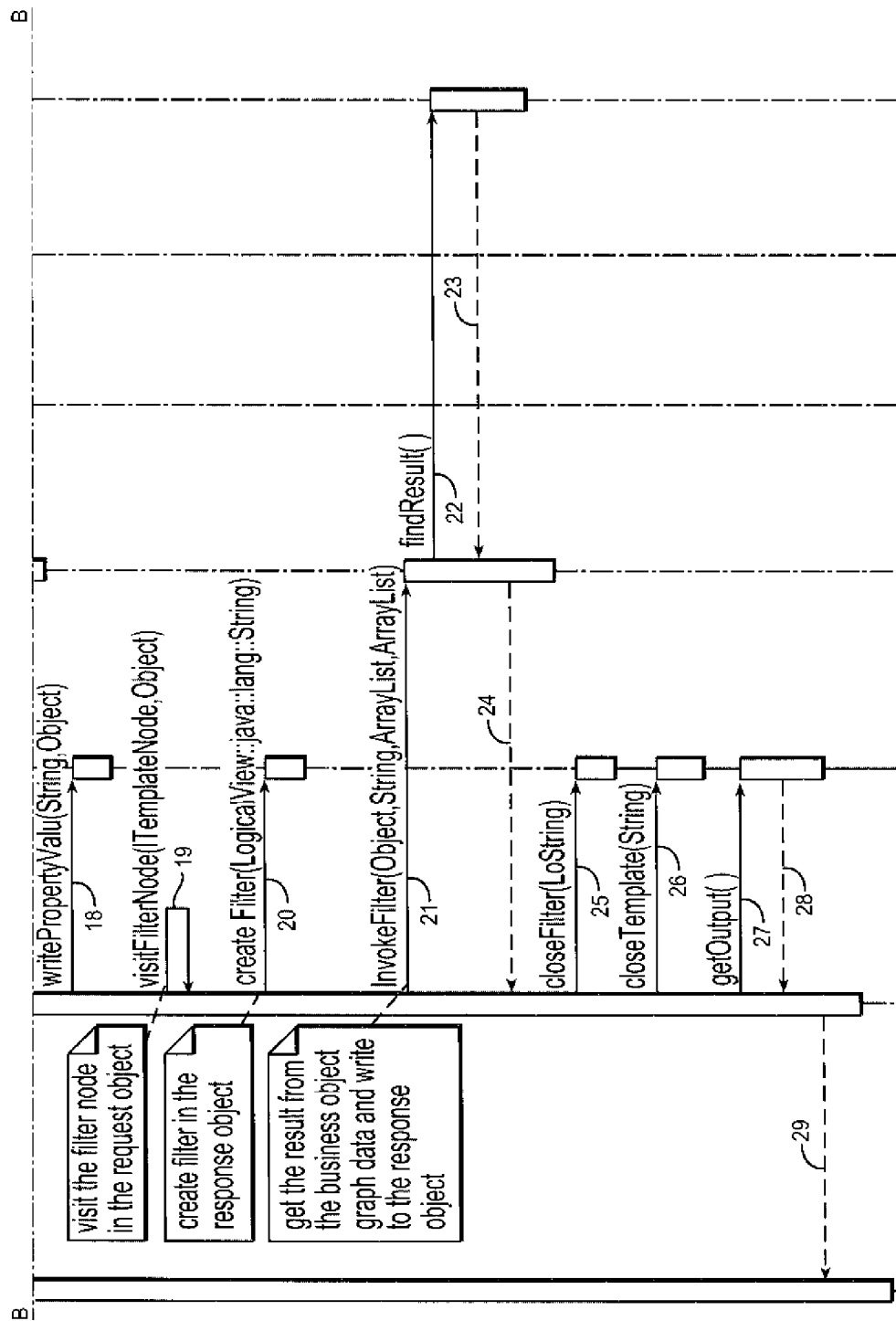

A detailed process flow of the process according to the preferred embodiment of the present invention is shown in FIG. 6. FIG. 6 illustrates Navigator access to either Beans and SOAPElements. Traversal of the information model is shown in steps 9 to 18. This results in the writing of a response object in step 18. FIG. 6 also depicts the creation of a filter object in the response object. A filter object further focuses the data response. Steps 19 to 24 apply any data request filter to the response data to create a filtered response 24. Finally the response object is returned to the requester 29.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

We claim:

1. A method for providing detailed data from a web service, the method comprising:
    receiving a web service request at a server from a requester at as client, said web service request containing a data request and a data response model, wherein the data response model specifies a level of detail of lessor detail than the detailed data, selected by the requestor, corresponding to the data request;
    accessing data in response to said web service request;
    determining as request information model from said data request;
    traversing said request information model and creating a data response from said accessed data where said information model satisfies the data response model;
    returning said data response to said requester; and
    determining whether said request object contains a filter and, if so, creating a response filter in said data response.

2. The method of claim 1, wherein the information model is information definitions corresponding to the accessed data.

3. The method of claim 1, wherein the information model is information definitions corresponding to relationships among the accessed data.

4. The method of claim 1, wherein said data response contains data at a finer level of detail than said accessed data.

5. The method of claim 1, wherein the information model is a hierarchy of linked elements corresponding to the accessed data.

6. A system for providing data responses to a requesting client that sends a data request to a web service having a web service interface, said data response being at a finer level of detail than defined by said web service interface, the system comprising:
    a web server for processing, web service requests; comprising:
        a processor; and
        a computer-readable, physical medium coupled to the processor;
        a data store on the computer-readable, physical medium storing data for a business process; and
        logic, stored on the computer-readable, physical medium and executed on the processor, for:
            parsing said data request into a web service object request and a data response, both originating from the client;
            accessing said data store to provide data according to said web service interface; and
            traversing a data model represented by the data request to identify and select data in response to said data response to create a data response output, wherein the data model specifics a level of detail of lessor detail than the detailed data, selected by the client, corresponding to the data request;
        network communication services for returning the data response output to the requesting client; and
        determining whether said request object contains a filter and, if so, creating a response filter in said data response output.

7. The system of claim 6, the information model comprising information definitions corresponding to the accessed data.

8. The system of claim 6, the information model comprising information definitions corresponding to relationships among the accessed data.

9. The system of claim 6, the information model comprising a hierarchy of linked elements corresponding to the access data.

10. The system of claim 6, the data response object data a liner level of detail than said accessed data.

11. A computer program product, comprising;
    a computer-readable, physical medium;
    computer program logic, stored on the computer-readable, physical medium for execution on a processor, for:
        receiving a service object data request and a data model, both from a client, wherein the data model specifies a level of detail of lessor detail than the detailed data, specified by the client, corresponding to the service object data request;
        accessing data from a service object in response to said service object data request;
        determining an information model for said accessed data based on said service object data request;
        traversing said information model and generating a data response for transmission to the client based on said data model, said data response containing data at a finer level of detail than said accessed data; and
        determining whether said request object contains a filter and, if so, creating a response filter in said data response.

12. The computer program product of claim 11, the information model comprising information definitions corresponding to the accessed data.

13. The computer program product of claim 11, the information model comprising information definitions corresponding to relationships among the accessed data.

14. The computer program product of claim 11, the information model comprising a hierarchy of linked elements corresponding to the accessed data.

* * * * *